(12) United States Patent
Gandhi et al.

(10) Patent No.: US 11,546,318 B2
(45) Date of Patent: Jan. 3, 2023

(54) SENSOR CERTIFICATE LIFECYCLE MANAGER FOR ACCESS AUTHENTICATION FOR NETWORK MANAGEMENT SYSTEMS

(71) Applicant: Cisco Technology, Inc., San Jose, CA (US)

(72) Inventors: Indermeet Singh Gandhi, Bangalore (IN); Jacob Earl Fussell, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 288 days.

(21) Appl. No.: 16/560,798

(22) Filed: Sep. 4, 2019

(65) Prior Publication Data

US 2021/0067505 A1 Mar. 4, 2021

(51) Int. Cl.
H04L 9/40 (2022.01)
H04L 67/12 (2022.01)
H04L 41/28 (2022.01)

(52) U.S. Cl.
CPC ...... H04L 63/0823 (2013.01); H04L 63/0892 (2013.01); H04L 67/12 (2013.01); H04L 41/28 (2013.01)

(58) Field of Classification Search
CPC . H04L 41/0213; H04L 41/0893; H04L 41/12; H04L 41/16; H04L 41/28; H04L 41/5019; H04L 41/5067; H04L 43/50; H04L 63/0823; H04L 63/0892; H04L 63/166; H04L 67/12
See application file for complete search history.

(56) References Cited

U.S. PATENT DOCUMENTS

| | | | |
|---|---|---|---|
| 8,422,686 B2 | 4/2013 | Cachin et al. | |
| 8,495,377 B2 | 7/2013 | Haddad et al. | |
| 8,798,273 B2 | 8/2014 | Rich et al. | |
| 2016/0323689 A1* | 11/2016 | Goluboff | H04W 12/069 |
| 2017/0041151 A1* | 2/2017 | Kommireddy | H04L 9/3228 |
| 2018/0183587 A1* | 6/2018 | Won | H04L 9/0891 |
| 2018/0288179 A1* | 10/2018 | Bhatia | H04L 67/28 |
| 2018/0316511 A1 | 11/2018 | Meyer et al. | |
| 2020/0153697 A1* | 5/2020 | Turner | H04L 41/12 |

OTHER PUBLICATIONS

Joshi et al., "Data Security In IOT Devices Using Key Lifecycle Management," VJER—Wishwakarma Journal of Engineering Research, vol. 1, Issue 4, Dec. 2017, pp. 1-8.

* cited by examiner

*Primary Examiner* — Gil H. Lee
(74) *Attorney, Agent, or Firm* — Polsinelli

(57) ABSTRACT

Systems and methods provided for a sensor certificate lifecycle manager for a network management system of an enterprise network for the automated generation of unique certificates for sensors used to act like a client device in the enterprise network for the purposes of troubleshooting. Furthermore, the network management and command center in association with the sensor certificate lifecycle manager manages a pool of signed unique certificates and have control over the lifecycle of such certificates, such as for revoking, transferring, and reassigning certificates for the sensors.

20 Claims, 8 Drawing Sheets

SENSOR CERTIFICATE LIFECYCLE MANAGER FOR ACCESS AUTHENTICATION FOR NETWORK MANAGEMENT SYSTEMS

TECHNICAL FIELD

The subject matter of this disclosure relates in general to the field of computer networking, and more particularly, to systems and methods for improving the operation of an enterprise network by way of brokering the management of certificates for network access authentication.

BACKGROUND

A network management system for an enterprise network requires network authentication for security purposes. Such an enterprise network can provide connectivity to computing devices (e.g., servers, workstations, desktop computers, laptop computers, tablets, mobile phones, etc.) and things (e.g., desk phones, security cameras, lighting, heating, ventilating, and air-conditioning (HVAC), windows, doors, locks, medical devices, industrial and manufacturing equipment, etc.) within environments such as offices, hospitals, colleges and universities, oil and gas facilities, factories, and similar locations.

Some of the unique challenges an enterprise network may face include troubleshooting the authentication of new client devices to be added into the wireless and/or wired enterprise network, which can include the exchanging and validating of Extensible Authentication Protocol Transport Layer Security ("EAP-TLS") certificates between client devices and the server(s) of the enterprise network. Currently, emulating the authentication using EAP-TLS certificates for the purposes of proactive troubleshooting of networks can require a user such as a network administrator to request generation of the certificate through a certificate authority, manually download the certificate, and export the certification to be manually uploaded into a network management and command center, such as Cisco's DNA Center. Then, the same certificate is sent to sensors that have been on-boarded and provisioned on the network management and command center. The sensors act like a client device in the enterprise network for the purposes of troubleshooting and determining if issues stem from the client device or from the server-side. However, the purpose of using the sensors with respect to the EAP-TLS certificates is to replicate a true network scenario for the proactive troubleshooting. Furthermore, a manual download from the certificate authority and upload in a network management and command center can be a huge security concern for enterprises because once a certificate is marked exportable and is then exported, that certificate could be used on any non-authorized device to authenticate the device to improperly join the enterprise network.

Thus, there is a need to generate signed unique certificates for the sensors, and especially one in which the result is an automated workflow of the above steps to avoid any need for manual intervention for security purposes. Furthermore, the network management and command center should be able to manage a pool of signed unique certificates and have control over the lifecycle of such certificates should there be a need to revoke, transfer, or reassign particular certificates, if a certificate is expired or a sensor is unreachable, for example.

BRIEF DESCRIPTION OF THE FIGURES

To provide a more complete understanding of the present disclosure and features and advantages thereof, reference is made to the following description, taken in conjunction with the accompanying drawings, in which.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Figure 1:
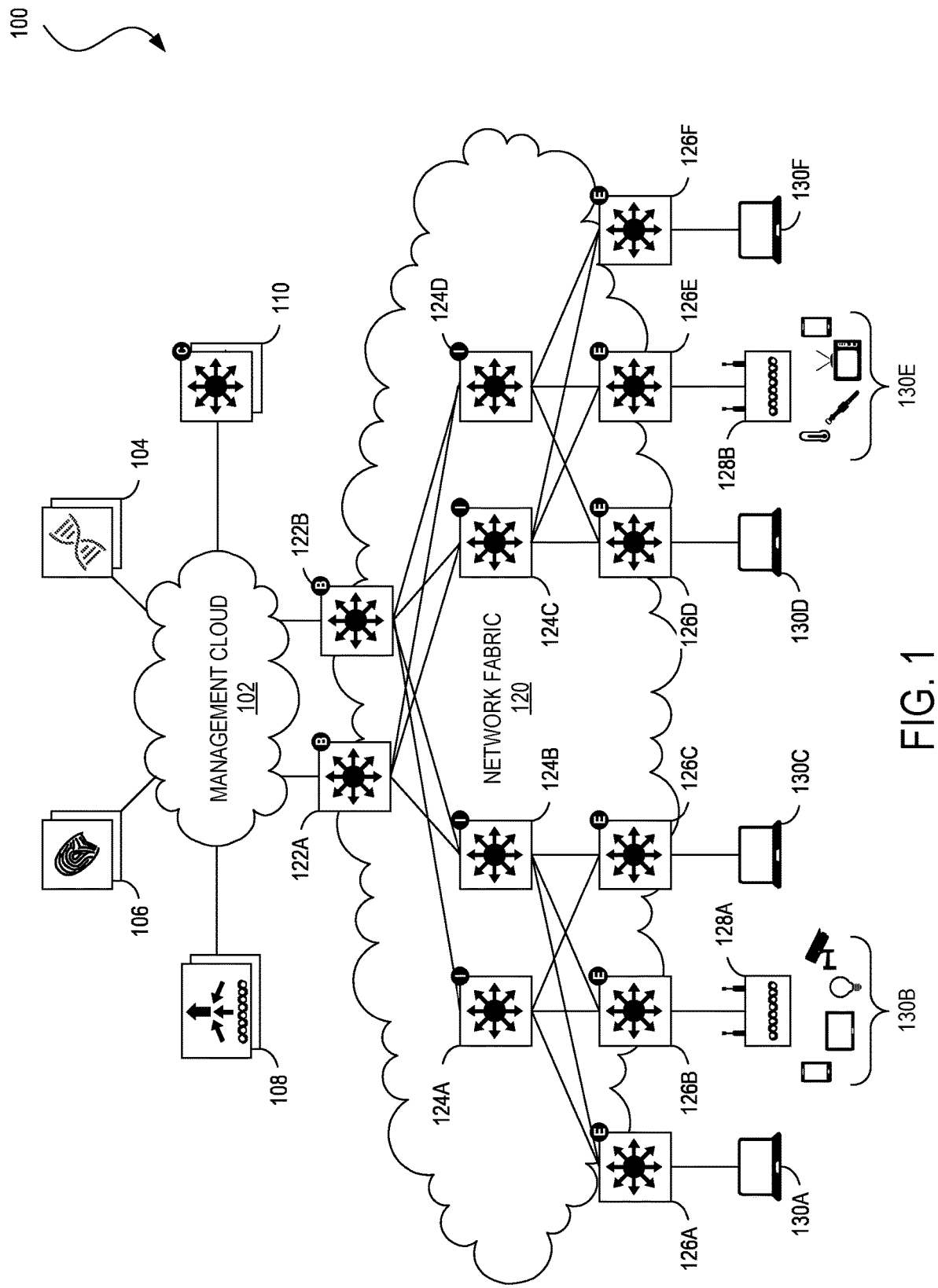
FIG. 1 illustrates an example of a physical topology of an enterprise network in accordance with an embodiment.

FIG. 1 illustrates an example of a physical topology of a network 100, that can be an enterprise network, for providing intent-based networking. It should be understood that, for the network 100 and any network discussed herein, there can be additional or fewer nodes, devices, links, networks, or components in similar or alternative configurations. Example embodiments with different numbers and/or types of endpoints, nodes, cloud components, servers, software components, devices, virtual or physical resources, configurations, topologies, services, appliances, or deployments are also contemplated herein. Further, the network 100 can include any number or type of resources, which can be accessed and utilized by endpoints or network devices. The illustrations and examples provided herein are for clarity and simplicity.

Intent-based networking is an approach for overcoming the deficiencies, discussed above and elsewhere in the present disclosure, of conventional enterprise networks. The motivation of intent-based networking is to enable a user to describe in plain language what he or she wants to accomplish (e.g., the user's intent) and have the network translate the user's objective into configuration and policy changes that are automatically propagated across a complex and heterogeneous computing environment. Thus, an intent-based network can abstract network complexity, automate much of the work of provisioning and managing the network typically handled by a network administrator, and assure secure operation and optimal performance of the network. As an intent-based network becomes aware of the users, devices, and things making connections in the network, it can automatically apply security permissions and service levels in accordance with the privileges and quality of experience (QoE) assigned to the users, devices, and things. Table 1 sets forth examples of intents and workflows that can be automated by an intent-based network to achieve a desired outcome.

TABLE 1

Examples of Intents and Associated Workflows

| Intent | Workflow |
|---|---|
| I need to scale out my application database | Extend network segments; update load balancer configuration; configure quality of service (QoS) |
| I have scheduled a telemedicine session at 10am | Create high-definition (HD) video connection; prioritize with end-to-end QoS; validate performance; keep the communication safe; tear down connection after call |
| I am rolling out a new IoT app for factory equipment monitoring | Create a new segment for all factory devices to connect to the IoT app; isolate from other traffic; apply service level agreement (SLA); validate SLA; optimize traffic flow |
| I need to deploy a secure multi-tier application | Provision multiple networks and subnets; configure access control lists (ACLs) and firewall rules; advertise routing information |

Some additional examples of use cases of an intent-based network:

An intent-based network can learn the performance needs of applications and services and adapt the network from end-to-end to achieve specified service levels;

Instead of sending technicians to every office, floor, building, or branch, an intent-based network can discover and identify devices and things as they connect, assign security and micro-segmentation profiles according to established policies, and continuously monitor access point performance to automatically adjust for QoE;

Users can move freely among network segments, mobile device in hand, and automatically connect with the correct security and access privileges;

Switches, routers, and other network devices can be powered up by local non-technical office personnel, and the network devices can be configured remotely (by a user or by the network) via a cloud management console with the appropriate policies as defined by the intents for the specific location (e.g., permanent employee access, visiting employee access, guest access, etc.); and Machine learning and artificial intelligence agents running in the network can continuously monitor and analyze network traffic and connections, compare activity against pre-defined intents such as application performance or security policies, detect malware intrusions in encrypted traffic and automatically isolate infected devices, and provide a historical record of network events for analysis and troubleshooting.

The network 100 includes a network management system 102 and a network fabric 120. Although shown as an external network or cloud to the network fabric 120 in this example, the network management system 102 may alternatively or additionally reside on the premises of an organization or in a colocation center (in addition to being hosted by a cloud provider or similar environment). The network management system 102 can provide a central management plane for building and operating the network fabric 120. The network management system 102 can be responsible for forwarding configuration and policy distribution, as well as device management and analytics. The network management system 102 can comprise one or more network controller appliances 104, one or more authentication, authorization, and accounting (AAA) appliances 106, one or more wireless local area network controllers (WLCs) 108, and one or more fabric control plane node(s) 110. In other embodiments, one or more elements of the network management system 102 may be co-located with the network fabric 120.

The network controller appliance(s) 104 can function as the command and control system for one or more network fabrics, and can house automated workflows for deploying and managing the network fabric(s). The network controller appliance(s) 104 can include automation, design, policy, provisioning, and assurance capabilities, among others, as discussed further below with respect to FIG. 2. In some embodiments, one or more Cisco Digital Network Architecture (Cisco DNA™) appliances can operate as the network controller appliance(s) 104.

The AAA appliance(s) 106 can control access to computing resources, facilitate enforcement of network policies, audit usage, and provide information necessary to bill for services. The AAA appliance can interact with the network controller appliance(s) 104 and with databases and directories containing information for users, devices, things, policies, billing, and similar information to provide authentication, authorization, and accounting services. In some embodiments, the AAA appliance(s) 106 can utilize Remote Authentication Dial-In User Service (RADIUS) or Diameter to communicate with devices and applications. In some embodiments, one or more Cisco® Identity Services Engine (ISE) appliances can operate as the AAA appliance(s) 106.

The WLC(s) 108 can support fabric-enabled access points attached to the network fabric 120, handling traditional tasks associated with a WLC as well as interactions with the fabric control plane for wireless endpoint registration and roaming. In some embodiments, the network fabric 120 can implement a wireless deployment that moves data-plane termination (e.g., VXLAN) from a centralized location (e.g., with previous overlay Control and Provisioning of Wireless Access Points (CAPWAP) deployments) to an access point/fabric edge node. This can enable distributed forwarding and distributed policy application for wireless traffic while retaining the benefits of centralized provisioning and administration. In some embodiments, one or more Cisco® Wireless Controllers, Cisco® Wireless LAN, and/or other Cisco DNA™-ready wireless controllers can operate as the WLC(s) 108.

The network fabric 120 can comprise fabric border nodes 122A and 122B (collectively, 122), fabric intermediate nodes 124A-D (collectively, 124), and fabric edge nodes 126A-F (collectively, 126). Although the fabric control plane node(s) 110 are shown to be external to the network fabric 120 in this example, in other embodiments, the fabric control plane node(s) 110 may be co-located with the network fabric 120. In embodiments where the fabric control plane node(s) 110 are co-located with the network fabric 120, the fabric control plane node(s) 110 may comprise a dedicated node or set of nodes or the functionality of the fabric control node(s) 110 may be implemented by the fabric border nodes 122.

The fabric control plane node(s) 110 can serve as a central database for tracking all users, devices, and things as they attach to the network fabric 120, and as they roam around. The fabric control plane node(s) 110 can allow network infrastructure (e.g., switches, routers, WLCs, etc.) to query the database to determine the locations of users, devices, and things attached to the fabric instead of using a flood and learn mechanism. In this manner, the fabric control plane node(s) 110 can operate as a single source of truth about where every endpoint attached to the network fabric 120 is located at any point in time. In addition to tracking specific endpoints (e.g., /32 address for IPv4, /128 address for IPv6, etc.), the fabric control plane node(s) 110 can also track larger summarized routers (e.g., IP/mask). This flexibility can help in summarization across fabric sites and improve overall scalability.

The fabric border nodes 122 can connect the network fabric 120 to traditional Layer 3 networks (e.g., non-fabric networks) or to different fabric sites. The fabric border nodes 122 can also translate context (e.g., user, device, or thing mapping and identity) from one fabric site to another fabric site or to a traditional network. When the encapsulation is the same across different fabric sites, the translation of fabric context is generally mapped 1:1. The fabric border nodes 122 can also exchange reachability and policy information with fabric control plane nodes of different fabric sites. The fabric border nodes 122 also provide border functions for internal networks and external networks. Internal borders can advertise a defined set of known subnets, such as those leading to a group of branch sites or to a data center. External borders, on the other hand, can advertise unknown destinations (e.g., to the Internet similar in operation to the function of a default route).

The fabric intermediate nodes 124 can operate as pure Layer 3 forwarders that connect the fabric border nodes 122 to the fabric edge nodes 126 and provide the Layer 3 underlay for fabric overlay traffic.

The fabric edge nodes 126 can connect endpoints to the network fabric 120 and can encapsulate/decapsulate and forward traffic from these endpoints to and from the network fabric. The fabric edge nodes 126 may operate at the perimeter of the network fabric 120 and can be the first points for attachment of users, devices, and things and the implementation of policy. In some embodiments, the network fabric 120 can also include fabric extended nodes (not shown) for attaching downstream non-fabric Layer 2 network devices to the network fabric 120 and thereby extend the network fabric. For example, extended nodes can be small switches (e.g., compact switch, industrial Ethernet switch, building automation switch, etc.) which connect to the fabric edge nodes via Layer 2. Devices or things connected to the fabric extended nodes can use the fabric edge nodes 126 for communication to outside subnets.

In this example, the network fabric can represent a single fabric site deployment which can be differentiated from a multi-site fabric deployment as discussed further below with respect to FIG. 4.

In some embodiments, all subnets hosted in a fabric site can be provisioned across every fabric edge node 126 in that fabric site. For example, if the subnet 10.10.10.0/24 is provisioned in a given fabric site, this subnet may be defined across all of the fabric edge nodes 126 in that fabric site, and endpoints located in that subnet can be placed on any fabric edge node 126 in that fabric. This can simplify IP address management and allow deployment of fewer but larger subnets. In some embodiments, one or more Cisco® Catalyst switches, Cisco Nexus® switches, Cisco Meraki® MS switches, Cisco® Integrated Services Routers (ISRs), Cisco® Aggregation Services Routers (ASRs), Cisco® Enterprise Network Compute Systems (ENCS), Cisco® Cloud Service Virtual Routers (CSRvs), Cisco Integrated Services Virtual Routers (ISRvs), Cisco Meraki® MX appliances, and/or other Cisco DNA-Ready™ devices can operate as the fabric nodes 122, 124, and 126.

The network 100 can also include wired endpoints 130A, 130C, 130D, and 130F and wireless endpoints 130B and 130E (collectively, 130). The wired endpoints 130A, 130C, 130D, and 130F can connect by wire to fabric edge nodes 126A, 126C, 126D, and 126F, respectively, and the wireless endpoints 130B and 130E can connect wirelessly to wireless access points 128B and 128E (collectively, 128), respectively, which in turn can connect by wire to fabric edge nodes 126B and 126E, respectively. In some embodiments, Cisco Aironet® access points, Cisco Meraki® MR access points, and/or other Cisco DNA™-ready access points can operate as the wireless access points 128.

The endpoints 130 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 130 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

In some embodiments, the network fabric 120 can support wired and wireless access as part of a single integrated infrastructure such that connectivity, mobility, and policy enforcement behavior are similar or the same for both wired and wireless endpoints. This can bring a unified experience for users, devices, and things that is independent of the access media.

In integrated wired and wireless deployments, control plane integration can be achieved with the WLC(s) 108 notifying the fabric control plane node(s) 110 of joins, roams, and disconnects by the wireless endpoints 130 such that the fabric control plane node(s) can have connectivity information about both wired and wireless endpoints in the network fabric 120, and can serve as the single source of truth for endpoints connected to the network fabric. For data plane integration, the WLC(s) 108 can instruct the fabric wireless access points 128 to form a VXLAN overlay tunnel to their adjacent fabric edge nodes 126. The AP VXLAN tunnel can carry segmentation and policy information to and from the fabric edge nodes 126, allowing connectivity and functionality identical or similar to that of a wired endpoint. When the wireless endpoints 130 join the network fabric 120 via the fabric wireless access points 128, the WLC(s) 108 can onboard the endpoints into the network fabric 120 and inform the fabric control plane node(s) 110 of the endpoints' Media Access Control (MAC) addresses. The WLC(s) 108 can then instruct the fabric wireless access points 128 to form VXLAN overlay tunnels to the adjacent fabric edge nodes 126. Next, the wireless endpoints 130 can obtain IP addresses for themselves via Dynamic Host Configuration Protocol (DHCP). Once that completes, the fabric edge nodes 126 can register the IP addresses of the wireless endpoint 130 to the fabric control plane node(s) 110 to form a mapping between the endpoints' MAC and IP addresses, and traffic to and from the wireless endpoints 130 can begin to flow.

Figure 2:
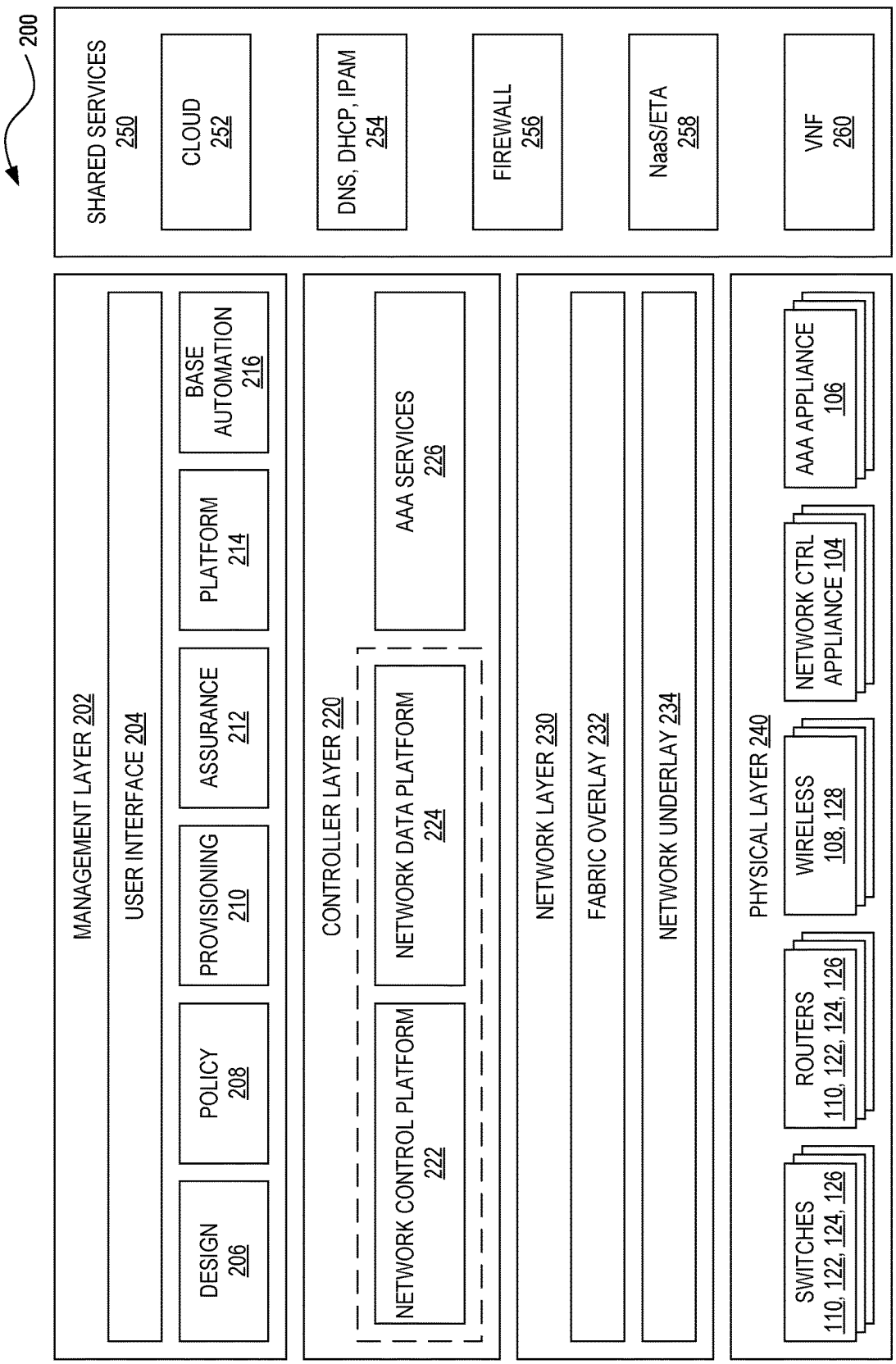
FIG. 2 illustrates an example of a logical architecture for an enterprise network in accordance with an embodiment.

FIG. 2 illustrates an example of a logical architecture 200 for the network 100 (e.g., an enterprise network). One of ordinary skill in the art will understand that, for the logical architecture 200 and any system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure. In this example, the logical architecture 200 includes a management layer 202, a controller layer 220, a network layer 230 (such as embodied by the network fabric 120), a physical layer 240 (such as embodied by the various elements of FIG. 1), and a shared services layer 250.

The management layer 202 can abstract the complexities and dependencies of other layers and provide a user with tools and workflows to manage the network 100 (e.g., an enterprise network). The management layer 202 can include a user interface 204, design functions 206, policy functions 208, provisioning functions 210, assurance functions 212, platform functions 214, and base automation functions 216. The user interface 204 can provide a user a single point to manage and automate the network. The user interface 204 can be implemented within a web application/web server accessible by a web browser and/or an application/application server accessible by a desktop application, a mobile app, a shell program or other command line interface (CLI), an Application Programming Interface (e.g., restful state transfer (REST), Simple Object Access Protocol (SOAP), Service Oriented Architecture (SOA), etc.), and/or other suitable interface in which the user can configure network infrastructure, devices, and things that are cloud-managed; provide user preferences; specify policies, enter data; review statistics; configure interactions or operations; and so forth. The user interface 204 may also provide visibility information, such as views of a network, network infrastructure, computing devices, and things. For example, the user interface 204 can provide a view of the status or conditions of the network, the operations taking place, services, performance, a topology or layout, protocols implemented, running processes, errors, notifications, alerts, network structure, ongoing communications, data analysis, and so forth.

The design functions 206 can include tools and workflows for managing site profiles, maps and floor plans, network settings, and IP address management, among others. The policy functions 208 can include tools and workflows for defining and managing network policies. The provisioning functions 210 can include tools and workflows for deploying the network. The assurance functions 212 can use machine learning and analytics to provide end-to-end visibility of the network by learning from the network infrastructure, endpoints, and other contextual sources of information. The platform functions 214 can include tools and workflows for integrating the network management system with other technologies. The base automation functions 216 can include tools and workflows to support the policy functions 208, the provisioning functions 210, the assurance functions 212, and the platform functions 214.

In some embodiments, the design functions 206, the policy functions 208, the provisioning functions 210, the assurance functions 212, the platform functions 214, and the base automation functions 216 can be implemented as microservices in which respective software functions are implemented in multiple containers communicating with each rather than amalgamating all tools and workflows into a single software binary. Each of the design functions 206, policy functions 208, provisioning functions 210, assurance functions 212, and platform functions 214 can be viewed as a set of related automation microservices to cover the design, policy authoring, provisioning, assurance, and cross-platform integration phases of the network lifecycle. The base automation functions 216 can support the top-level functions by allowing users to perform certain network-wide tasks.

FIGS. 3A-3I illustrate examples of graphical user interfaces for implementing the user interface 204. Although FIGS. 3A-3I show the graphical user interfaces as comprising webpages displayed in a browser executing on a large form-factor general purpose computing device (e.g., server, workstation, desktop, laptop, etc.), the principles disclosed in the present disclosure are widely applicable to client devices of other form factors, including tablet computers, smart phones, wearable devices, or other small form-factor general purpose computing devices; televisions; set top boxes; IoT devices; and other electronic devices capable of connecting to a network and including input/output components to enable a user to interact with a network management system. One of ordinary skill will also understand that the graphical user interfaces of FIGS. 3A-3I are but one example of a user interface for managing a network. Other embodiments may include a fewer number or a greater number of elements.

Figure 3:
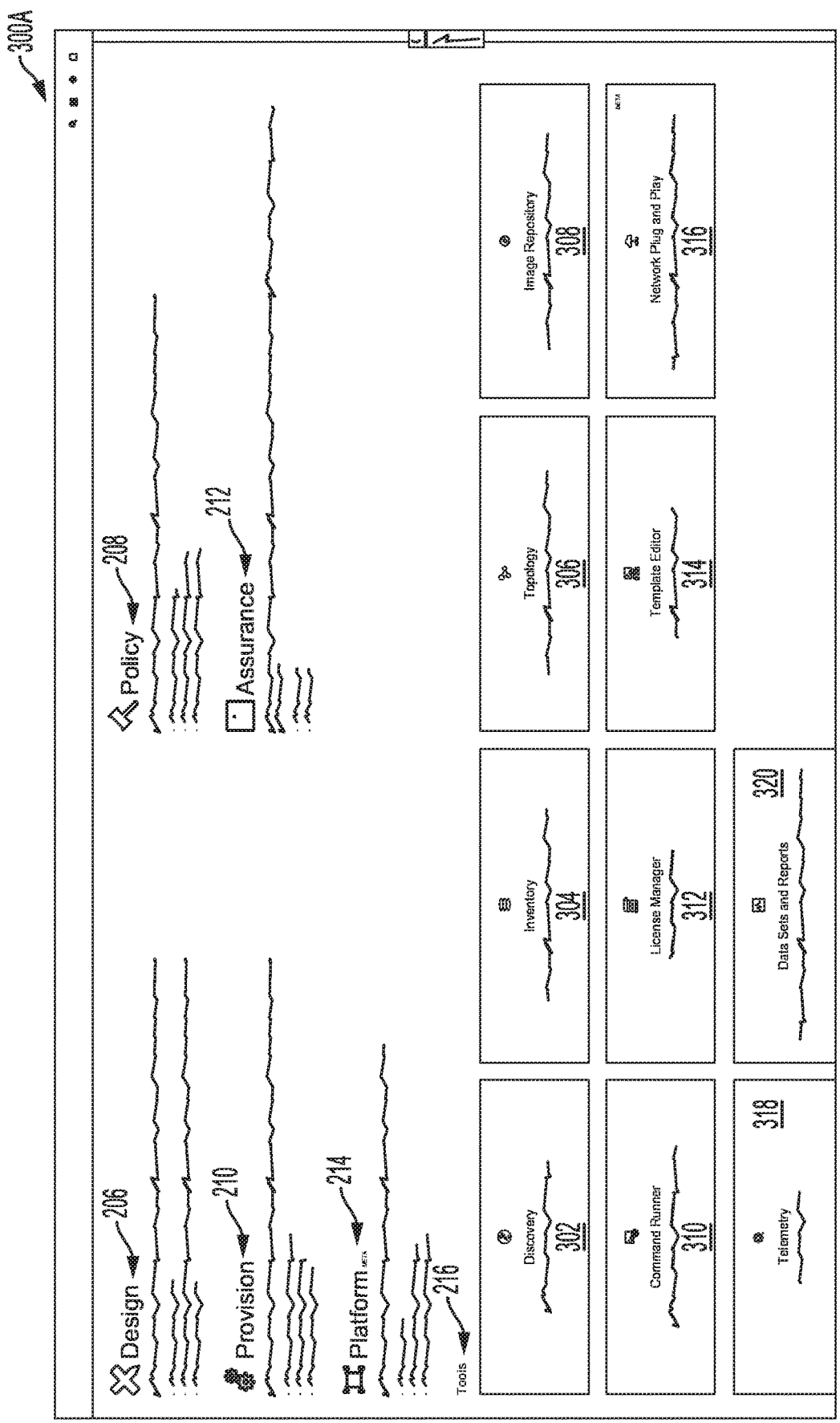
FIG. 3 illustrate an example of a graphical user interface for a network management system in accordance with an embodiment.

FIG. 3A illustrates a graphical user interface 300A, which is an example of a landing screen or a home screen of the user interface 204. The graphical user interface 300A can include user interface elements for selecting the design functions 206, the policy functions 208, the provisioning functions 210, the assurance functions 212, and the platform functions 214. The graphical user interface 300A also includes user interface elements for selecting the base automation functions 216. In this example, the base automation functions 216 include:

A network discovery tool 302 for automating the discovery of existing network elements to populate into inventory;

An inventory management tool 304 for managing the set of physical and virtual network elements;

A topology tool 306 for visualizing the physical topology of network elements;

An image repository tool 308 for managing software images for network elements;

A command runner tool 310 for diagnosing one or more network elements based on a CLI;

A license manager tool 312 for administering visualizing software license usage in the network;

A template editor tool 314 for creating and authoring CLI templates associated with network elements in a design profile;

A network PnP tool 316 for supporting the automated configuration of network elements;

A telemetry tool 318 for designing a telemetry profile and applying the telemetry profile to network elements; and A data set and reports tool 320 for accessing various data sets, scheduling data extracts, and generating reports in multiple formats (e.g., Post Document Format (PDF), comma-separate values (CSV), Tableau, etc.), such as an inventory data report, a software image management (SWIM) server report, and a client data report, among others.

With respect to FIG. 2, the controller layer 220 can comprise subsystems for the management layer 202 and may include a network control platform 222, a network data platform 224, and AAA services 226. These controller subsystems can form an abstraction layer to hide the complexities and dependencies of managing many network elements and protocols.

The network control platform 222 can provide automation and orchestration services for the network layer 230 and the physical layer 240, and can include the settings, protocols, and tables to automate management of the network and physical layers. For example, the network layer 230 can provide the design functions 206, the provisioning functions 208 212. In addition, the network layer 230 can include tools and workflows for discovering switches, routers, wireless controllers, and other network infrastructure devices (e.g., the network discovery tool 302); maintaining network and endpoint details, configurations, and software versions (e.g., the inventory management tool 304); Plug-and-Play (PnP) for automating deployment of network infrastructure (e.g., the network PnP tool 316), Path Trace for creating visual data paths to accelerate the troubleshooting of connectivity problems, Easy QoS for automating quality of service to prioritize applications across the network, and Enterprise Service Automation (ESA) for automating deployment of physical and virtual network services, among others. The network control platform 222 can communicate with network elements using Network Configuration (NETCONF)/Yet Another Next Generation (YANG), Simple Network Management Protocol (SNMP), Secure Shell (SSH)/Telnet, and so forth. In some embodiments, the Cisco® Network Control Platform (NCP) can operate as the network control platform 222

The network data platform 224 can provide for network data collection, analytics, and assurance, and may include the settings, protocols, and tables to monitor and analyze network infrastructure and endpoints connected to the network. The network data platform 224 can collect multiple types of information from network infrastructure devices, including syslog, SNMP, NetFlow, Switched Port Analyzer (SPAN), and streaming telemetry, among others. The network data platform 224 can also collect use contextual information shared from In some embodiments, one or more Cisco DNA™ Center appliances can provide the functionalities of the management layer 202, the network control platform 222, and the network data platform 224. The Cisco DNA™ Center appliances can support horizontal scalability by adding additional Cisco DNA™ Center nodes to an existing cluster; high availability for both hardware components and software packages; backup and store mechanisms to support disaster discovery scenarios; role-based access control mechanisms for differentiated access to users, devices, and things based on roles and scope; and programmable interfaces to enable integration with third party vendors. The Cisco DNA™ Center appliances can also be cloud-tethered to provide for the upgrade of existing functions and additions of new packages and applications without having to manually download and install them.

The AAA services 226 can provide identity and policy services for the network layer 230 and physical layer 240, and may include the settings, protocols, and tables to support endpoint identification and policy enforcement services. The AAA services 226 can provide tools and workflows to manage virtual networks and security groups, and to create group-based policies and contracts. The AAA services 226 can identify and profile network infrastructure devices and endpoints using AAA/RADIUS, 802.1X, MAC Authentication Bypass (MAB), web authentication, and EasyConnect, among others. The AAA services 226 can also collect and use contextual information from the network control platform 222, the network data platform 224, and the shared services layer 250, among others. In some embodiments, Cisco® ISE can provide the AAA services 226.

The network layer 230 can be conceptualized as a composition of two layers, an underlay 234 comprising physical and virtual network infrastructure (e.g., routers, switches, WLCs, etc.) and a Layer 3 routing protocol for forwarding traffic, and an overlay 232 comprising a virtual topology for logically connecting wired and wireless users, devices, and things and applying services and policies to these entities. Network elements of the underlay 234 can establish connectivity between each other, such as via Internet Protocol (IP). The underlay may use any topology and routing protocol.

In some embodiments, the network controller 104 can provide a local area network (LAN) automation service, such as implemented by Cisco DNA™ Center LAN Automation, to automatically discover, provision, and deploy network devices. Once discovered, the automated underlay provisioning service can leverage Plug and Play (PnP) to apply the required protocol and network address configurations to the physical network infrastructure. In some embodiments, the LAN automation service may implement the Intermediate System to Intermediate System (IS-IS) protocol. Some of the advantages of IS-IS include neighbor establishment without IP protocol dependencies, peering capability using loopback addresses, and agnostic treatment of IPv4, IPv6, and non-IP traffic.

The overlay 232 can be a logical, virtualized topology built on top of the underlay 234, and can include a fabric data plane, a fabric control plane, and a fabric policy plane. In some embodiments, the fabric data plane can be created via packet encapsulation using Virtual Extensible LAN (VXLAN) with Group Policy Option (GPO). Some of the advantages of VXLAN-GPO include its support for both Layer 2 and Layer 3 virtual topologies (overlays), and its ability to operate over any IP network with built-in network segmentation.

In some embodiments, the fabric control plane can implement Locator/ID Separation Protocol (LISP) for logically mapping and resolving users, devices, and things. LISP can simplify routing by removing the need for each router to process every possible IP destination address and route. LISP can achieve this by moving remote destination to a centralized map database that allows each router to manage only its local routers and query the map system to locate destination endpoints.

The fabric policy plane is where intent can be translated into network policy. That is, the policy plane is where the network operator can instantiate logical network policy based on services offered by the network fabric 120, such as security segmentation services, quality of service (QoS), capture/copy services, application visibility services, and so forth.

Segmentation is a method or technology used to separate specific groups of users or devices from other groups for the purpose of reducing congestion, improving security, containing network problems, controlling access, and so forth. As discussed, the fabric data plane can implement VXLAN encapsulation to provide network segmentation by using the virtual network identifier (VNI) and Scalable Group Tag (SGT) fields in packet headers. The network fabric 120 can support both macro-segmentation and micro-segmentation. Macro-segmentation logically separates a network topology into smaller virtual networks by using a unique network identifier and separate forwarding tables. This can be instantiated as a virtual routing and forwarding (VRF) instance and referred to as a virtual network (VN). That is, a VN is a logical network instance within the network fabric 120 defined by a Layer 3 routing domain and can provide both Layer 2 and Layer 3 services (using the VXLAN VNI to provide both Layer 2 and Layer 3 segmentation). Micro-segmentation logically separates user or device groups within a VN, by enforcing source to destination access control permissions, such as by using access control lists (ACLs). A scalable group is a logical object identifier assigned to a group of users, devices, or things in the network fabric 120. It can be used as source and destination classifiers in Scalable Group ACLs (SGACLs). The SGT can be used to provide address-agnostic group-based policies.

In some embodiments, the fabric control plane node(s) 110 may implement the Locator/Identifier Separation Protocol (LISP) to communicate with one another and with the network management system 102. Thus, the control plane nodes may operate a host tracking database, a map server, and a map resolver. The host tracking database can track the endpoints 130 connected to the network fabric 120 and associate the endpoints to the fabric edge nodes 126, thereby decoupling an endpoint's identifier (e.g., IP or MAC address) from its location (e.g., closest router) in the network.

The physical layer 240 can comprise network infrastructure devices, such the fabric control plane node(s) 110, the fabric nodes 122, 124, and 126, WLC(s) 108, wireless access points 128, and network appliances, such as the network controller appliance(s) 104, and the AAA appliance(s) 106.

The shared services layer 250 can provide an interface to external network services, such as cloud services 252; Domain Name System (DNS), DHCP, IP Address Management (IPAM), and other network address management services 254; firewall services 256; Network as a Sensor (Naas)/Encrypted Threat Analytics (ETA) services; and Virtual Network Functions (VNFs) 260; among others. The management layer 202 and/or the controller layer 220 can share identity, policy, forwarding information, and so forth via the shared services layer 250 using APIs.

Figure 4:
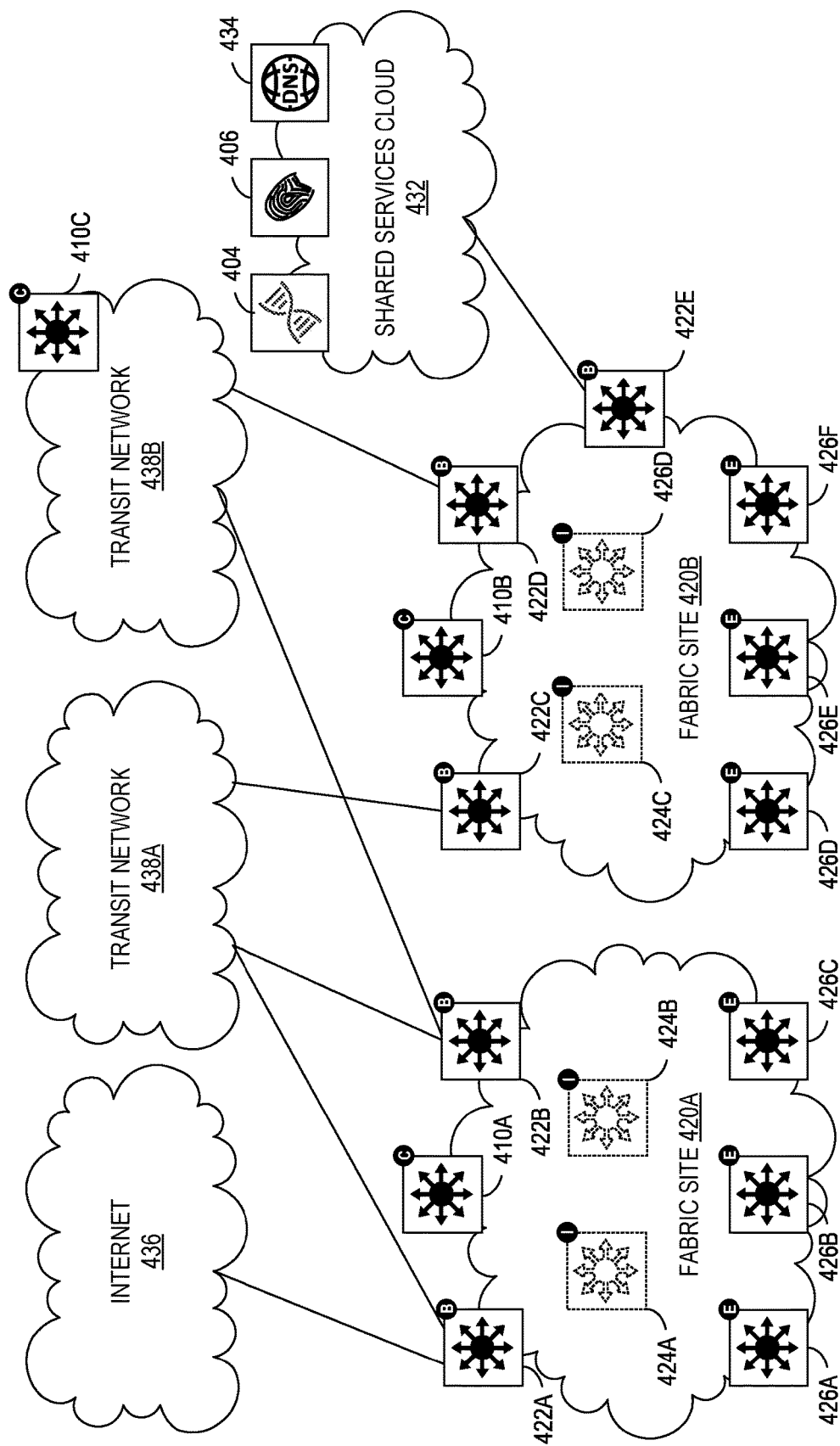
FIG. 4 illustrates an example of a physical topology for a multi-site enterprise network in accordance with an embodiment.

FIG. 4 illustrates an example of a physical topology for a multi-site enterprise network 400. In this example, the network fabric comprises fabric sites 420A and 420B. The fabric site 420A can include a fabric control node 410A, fabric border nodes 422A and 422B, fabric intermediate nodes 424A and 424B (shown here in dashed line and not connected to the fabric border nodes or the fabric edge nodes for simplicity), and fabric edge nodes 426A-D. The fabric site 420B can include a fabric control node 410B, fabric border nodes 422C-E, fabric intermediate nodes 424C and 424D, and fabric edge nodes 426D-F. Multiple fabric sites corresponding to a single fabric, such as the network fabric of FIG. 4, can be interconnected by a transit network. A transit network can be a portion of a network fabric that has its own control plane nodes and border nodes but does not have edge nodes. In addition, a transit network shares at least one border node with each fabric site that it interconnects.

In general, a transit network connects a network fabric to the external world. There are several approaches to external connectivity, such as a traditional IP network 436, traditional WAN 438A, Software-Defined WAN (SD-WAN) (not shown), or Software-Defined Access (SD-Access) 438B. Traffic across fabric sites, and to other types of sites, can use the control plane and data plane of the transit network to provide connectivity between these sites. A local border node can operate as the handoff point from the fabric site, and the transit network can deliver traffic to other sites. The transit network may use additional features. For example, if the transit network is a WAN, then features like performance routing may also be used. To provide end-to-end policy and segmentation, the transit network may be capable of carrying endpoint context information (e.g., VRF, SGT) across the network. Otherwise, a re-classification of the traffic may be needed at the destinate site border.

The local control plane in a fabric site may only hold state relevant to endpoints that are connected to edge nodes within the local fabric site. The local control plane can register local endpoints via local edge nodes, as with a single fabric site (e.g., the network fabric 120). An endpoint that isn't explicitly registered with the local control plane may be assumed to be reachable via border nodes connected to the transit network. In some embodiments, the local control plane may not hold state for endpoints attached to other fabric sites such that the border nodes do not register information from the transit network. In this manner, the local control plane can be independent of other fabric sites, thus enhancing overall scalability of the network.

The control plane in the transit network can hold summary state for all fabric sites that it interconnects. This information can be registered to the transit control plane by border from different fabric sites. The border nodes can register EID information from the local fabric site into the transit network control plane for summary EIDs only and thus further improve scalability.

The multi-site enterprise network 400 can also include a shared services cloud 432. The shared services cloud 432 can comprise one or more network controller appliance(s) 404, one or more AAA appliances 406, and other shared servers (e.g., DNS; DHCP; IPAM; SNMP and other monitoring tools; NetFlow, syslog, and other data collectors, etc.) may reside. These shared services can generally reside outside of the network fabric and in a global routing table (GRT) of an existing network. In this case, some method of inter-VRF routing may be required. One option for inter-VRF routing is to use a fusion router, which can be an external router that performs inter-VRF leaking (e.g., import/export of VRF routes) to fuse the VRFs together. Multi-Protocol can be used for this route exchange since it can inherently prevent routing loops (e.g., using the AS_PATH attribute). Other routing protocols can also be used but may require complex distribute-lists and prefix-lists to prevent loops.

However, there can be several disadvantages in using a fusion router to achieve inter-VN communication, such as route duplication because routes leaked from one VRF to another are programmed in hardware tables and can result in more TCAM utilization, manual configuration at multiple touch points wherever route-leaking is implemented, loss of SGT context because SGTs may not be maintained across VRFs and must be re-classified once the traffic enters the other VRF, and traffic hairpinning because traffic may need to be routed to the fusion router, and then back to the fabric border node.

SD-Access Extranet can provide a flexible and scalable method for achieving inter-VN communications by avoiding route duplication because inter-VN lookup occurs in the fabric control plane (e.g., software) such that route entries do not need to be duplicated in hardware; providing a single touchpoint because the network management system (e.g., Cisco DNA™ Center) can automate the inter-VN lookup policy, making it a single point of management; maintaining SGT context because the inter-VN lookup occurs in the control plane node(s) (e.g., software), and avoids hair-pinning because inter-VN forwarding can occur at the fabric edge (e.g., the same intra-VN) so traffic does not need to hairpin at the border node. Another advantage is that a separate VN can be made for each of the common resources that are needed (e.g., a Shared Services VN, an Internet VN, a data center VN, etc.).

Figure 5:
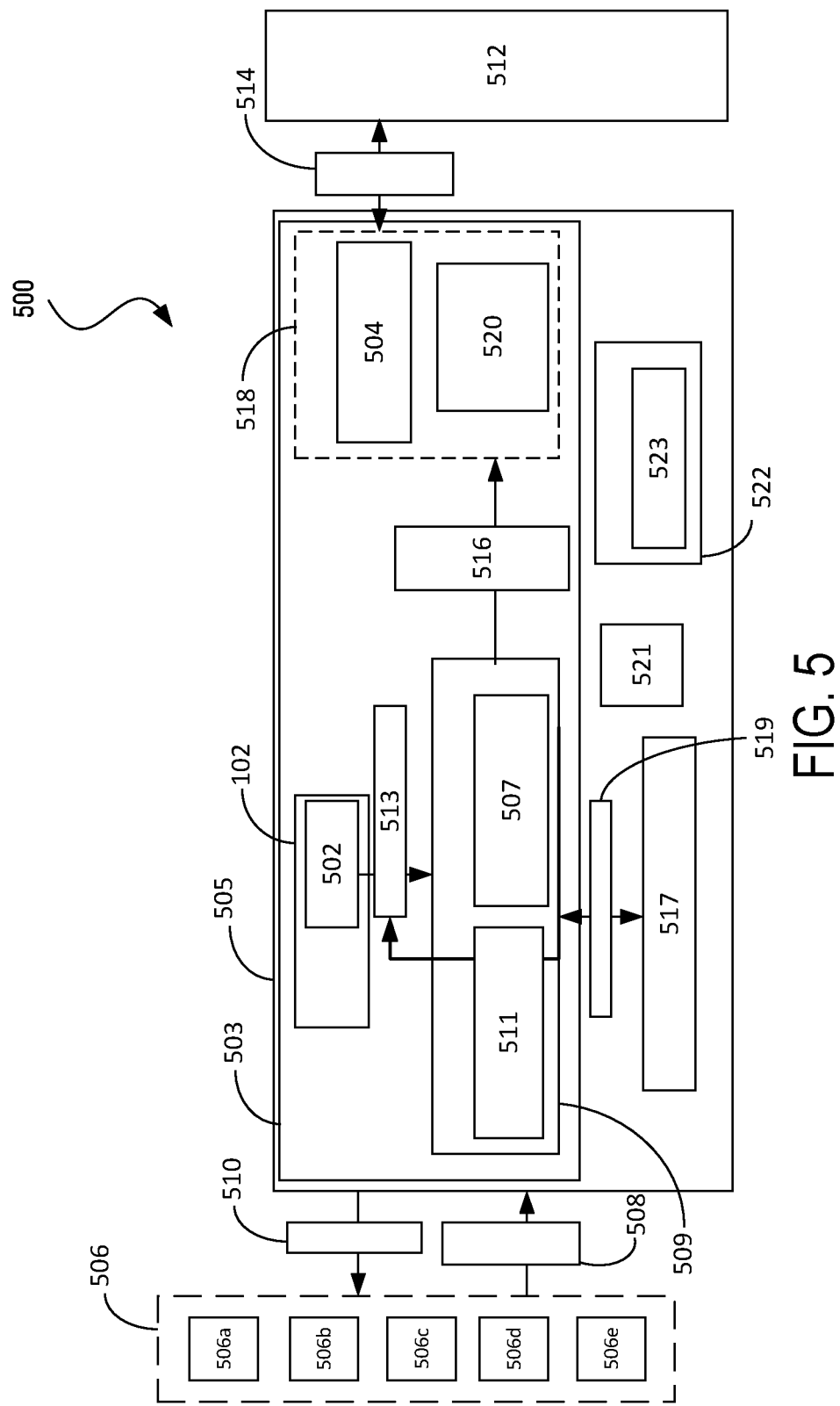
FIG. 5 illustrates an example of a logical architecture for the network management system in relation to a sensor certificate lifecycle manager in accordance with an embodiment.

FIG. 5 illustrates an example of a logical architecture for a system 500 comprising the network management system 102, such as Cisco's DNA Center, in relation to the sensor certificate lifecycle manager ("SCLM") 504 in accordance with an embodiment. For the network management system 102 to troubleshoot the same authentication mechanism and protocol as that which a client device experiences, a sensor(s) 506 (506a, 506b, 506c, . . . etc.), which can be a dedicated sensor radio in a very small form factor, can be used to run tests against client devices running on a same access point for the same network 100. The SCLM 504 can facilitate lifecycle management of the sensors 506, the provisioning of certificates 510 on the sensors 506, and the automated generation of the certificates 510.

The sensor 506 can comprise a single mode of operation as a network sensor for wireless service assurance for the network management system 102 that the sensor 506 is associated with. The sensor can comprise two integrated omnidirectional 2.4 GHz single band and 5 GHz single band antennas. The sensor can comprise a peak antenna gain of approximately 3 dBi and 5 dBi in 2.4 GHz and 5 GHz bands respectively. The sensor can comprise any of the following ratio features supported: 2.4 GHz and 5 GHz concurrent radios, 2 GHz radio with 2TX×2RX and two spatial streams SU-MIMO, 5 GHz radio with 2TX×2RX 802.11ac Wave 2 capable with two spatial streams SU-MIMO and MU-MIMO, 802.11ac based Transmit Beamforming, Quality of Service (QoS), Radio Resource Management (RRM), Band-Select, and/or Bluetooth Low Energy 4.0.

The sensor 506 can further comprise hardware external interfaces such as a 10/100/1000 BASE-T (Ethernet) Uplink Interface with inline power capability, Auto-MDIX (automatically support either straight through or crossover cables), and/or 802.3af/at PoE. The sensor can comprise a UART console port connection using a custom console cable AIR-CONSADPT=. For RJ45 connectivity to the port, you will require a custom UART-RJ45 adapter. The sensor can comprise a USB adapter module (AIR-MOD-USB-xx), an AC adapter module (AIR-MOD-AC), and/or aPoE/Ethernet module (AIR-MOD-POE). Thus, depending on the model of the network sensor and the mounting option chosen, the sensor can be powered using USB power 5V, 1.5A, AC power, from Cisco-supplied AC Adapter, providing 120~240 VAC, 50~60 Hz power, and/or PoE power from a network device supplying 802.3af Class 0 power or greater (or power injectors AIR-PWRINJ5 (for 802.3af) or AIR-PWRINJ6 (for 802.3at)). The sensor 506 can comprise a reset button, a multi-color LED status indicator, a Kensington security lock slot, recesses on the back of the sensor into which the hooks on the wall-mount bracket slide and click into place, and/or a RS-232 console interface port, hidden under a mylar label for a custom console cable AIR-CONSADPT=. The sensor can comprise a 10/100/1000 BASE-T (Ethernet) Uplink Interface with inline power capability, Auto-MDIX (automatically support either straight through or crossover cables), 802.3af/at PoE-In, and/or a USB port for powering the sensor, using 5V, 1.5A power. An example of the sensor 506 is Cisco's Aironet 1800s Active Sensor.

The network management system 102 can collect statistics and data from the sensors 506, infrastructure access points, and client devices, and can display real-time information based on the data collected. A dashboard UI 502 can interface with the network management system 102, to send the collected data at regular intervals and enable the dashboard UI 502 to display historical information about health of the enterprise network 100. Each sensor 506 can establish a management and control connection to the network management system 102 over an intermediate IPv4/IPv6 network.

The network management system 102 can also operate as a control center that determines the current task for each sensor 506. In addition to configuring sensors 506, the network management system 102 can also collect, aggregate, parse, and present statistics and results returned from each sensor 506. The network management system 102 can also use data from the sensor 506 for basic connectivity troubleshooting, radio-frequency performance troubleshooting, and/or wireless quality of experience (QoE) troubleshooting. The network management system 102 can also periodically send wireless network information to the network management system 102 for performance analytics. The network controller appliance(s) 104 can act as an assurance collector of the network management system 102 and can also be cloud-based and scheduled by the network management system 102 to collect historical network assurance data collected by the sensors 506.

Once the sensor 506 is powered on, it can be provisioned onto the network management system 102 using a near zero touch deployment experience via a network plug and play ("PnP") application through a PnP device interface 508, a PnP connection Manager 509, and a PnP Onboarding Service 507. Each sensor 506 can be uniquely identified by its Serial Number ("S/N") and/or MAC address on the network management system 102. Via the PnP Onboarding Service 507, a sensor profile can be created through the network management system 102's dashboard UI 502, wherein the sensor profile can include a settings name, a wireless network name (SSID), and an appropriate security settings. Then, if the sensor 506 is unclaimed, it can appear in an unclaimed device list if the unclaimed sensor has network reachability to the network management system 102. Once selected, the correct floor and the sensor profile can be selected to provision and onboard the sensor 506 into the inventory of the network management system 102. Once provisioned, the sensor 506 can be joined if authorized via a client certificate 510, such as an EAP-TLS certificate.

As shown in FIG. 5, a clustering core 505, such as a Maglev Core, that allows the clustering of multiple appliances and serves as a database synchronization and configuration platform and/or service that allows for the network management system 102 to act as an intermediary between the sensor 506 and the certificate authority 512 having a certificate authority server. The clustering core 505 can comprise a Fusion 503 that can comprise the network management system 102, a PnP Offer 511, Fusion Services 518, Maglev Common Services 517, a PnP Data interface 521, and cloud database services 522, such as MongoDB cloud database services, comprising PnP Data 523. The PnP Offer 511 can include the PnP Onboarding Service 507 and the PnP connection Manager 509 having a PnP Northbound API interface 513. The PnP Offer 511 can interface with Fusion Services 518 via a PnP-Fusion Services REST interface 516 as well as with the Maglev Common Services 517 through a PnP-Maglev Services interface 519. The Fusion Services 518 can include the SCLM 504 and other services 520, such as templating, PM, SWIM, and licensing.

As part of an extended provisioning process, the SCLM 504 can initiate a sensor authentication process with the certificate authority 512. This could be over Offensive Security Certified Professional ("OSCP"), Simple Certificate Enrollment Protocol ("SCEP") (and via an SCEP interface 514) or any similar protocol or API. Examples of the certificate authority 512 include Microsoft's certificate authority, Symantec/s certificate authority, or a similar interface to communicate with Cisco's Identity Services Engine (ISE), which can also work as the certificate authority, or use a PX grid to communicate with Cisco's ISE.

For example, the SCLM 504 can generate a unique identifier which it maps to the Serial Number ("S/N") and/or MAC address of the sensor 506a obtained through the provisioning process. If using the SCEP protocol, the SCLM 504 can submit a certificate signing request (CRS) to the certificate authority 512, submitting a CertRequest, per Public Key Cryptography Standards #10 (PCKS #10), a standard that defines a binary format for encoding CSRs for use with X.509. The CRS can be signed by the network management system 102, on behalf of the sensors 506, which can add the unique identifier as serialNumber, as referenced in PCKS #9, an attribute in CertRequest. The serialNumber is not the S/N of the sensor 506a, which allows the reuse and recycling of certificates 510 for another sensor 506b through certificate pooling. The serial number can also be translated to another identifier so long as the identifier remains unique for each of the sensors 506.

The certificate authority 512 can use the unique attributes of the generated identifier to generate and sign a X.509 certificate 510 for the sensor 506. The SCLM 504 can also fetch multiple signed unique certificates 510 for different sensors in one transaction because the Cert Response (CertResp) from the certificate authority 512 can contain multiple X.509 certificates 510 and # of certs requested for can be an attribute in the certificate signing request to the certificate authority 512 using a PKCSReg or a GetCert request. See section 3.2.2.1 draft-nourse-scep-23.

At the end of the provisioning of sensors 506, the SCLM 504 can maintain a pool of signed unique certificates for sensors 506, which are then used accordingly, such as to run proactive troubleshooting tests. One test that the sensor 506 can perform is whether or not the authentication mechanism and protocol is operating properly, and for most enterprises, the EAP-TLS certificate 510 is used for the authentication mechanism. For example, if a client device were experiencing issues, a sensor sharing the same access point and SSID can run a test to determine if the issue lies with the client device or if the problem is on the server-side, with respect to the same access point and SSID. Also, to validate the EAP-TLS test, if the user is having authentication issues, but the sensor 506 is not, then it is possible that the certificate 510 for the client device is expired. In addition, the SCLM 504 can check whether or not the certificates 510 left in the pool of signed unique certificates are lower than a threshold number and if so, request the certificate authority 512 for more. The SCLM 504 can set a threshold number as a preference such that there is an "available number of certificates" as the certificates are assigned/mapped to sensors and the available number is decremented until it drops to/below the threshold.

Once the sensor 506 is on-boarded to the network management system 102, the sensor and the network management system 102 can regularly exchange heartbeat messages, which are periodic messages that indicate that the connection is still active. Sensors 506 can be connected through a POE slot or a wireless link, assigned an IP address, wherein a dedicate session can be established so that heartbeat messages can be pushed in either direction at a set interval. Furthermore, the certificates 510 can be appended to the heartbeat messages. When the sensors 506 are powered off or relocated to another network management system 102, the certificate is revoked for the sensor 506. If there is a timeout in the heartbeat messages, such that a heartbeat message was not received for a certain period of duration, the sensor 506 can be deemed as unreachable. The associated certificate 510 can then be revoked and added back into the pool of signed unique certificates to be reassigned. In addition, every certificate 510 can have an expiry timeline that requires it to be renewed after a certain period of time.

Figure 6:
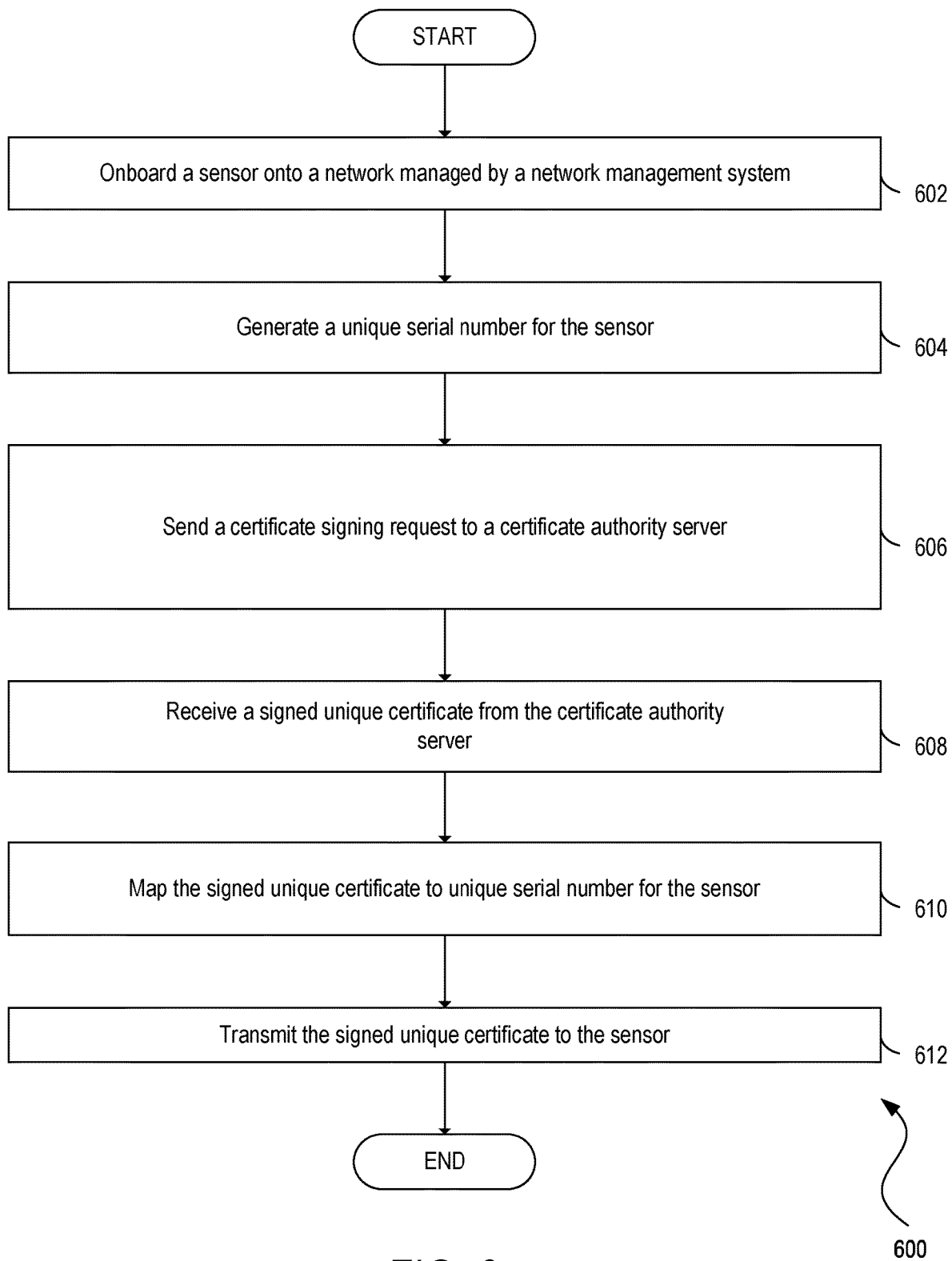
FIG. 6 illustrates a flow diagram for a method of generating and transmitting a signed unique certificate to a sensor for a network management system in accordance with an embodiment.

FIG. 6 illustrates a flow diagram 600 for a method of generating and transmitting a signed unique certificate 510 to a sensor 506 for a network management system 102 in accordance with an embodiment. In step 602, the sensor 506 may be onboarded onto the network 100 managed by the network management system 102. In step 604, a unique serial number for the sensor may be generated. In step 606, a certificate signing request may be sent to the certificate authority 512. In step 608, a signed unique certificate 510 may be received from the certificate authority 512. In step 610, the signed unique certificate 510 may be mapped to a unique serial number for the sensor 506. In step 612, the signed unique certificate 510 may be transmitted to the sensor 506.

Figure 7:
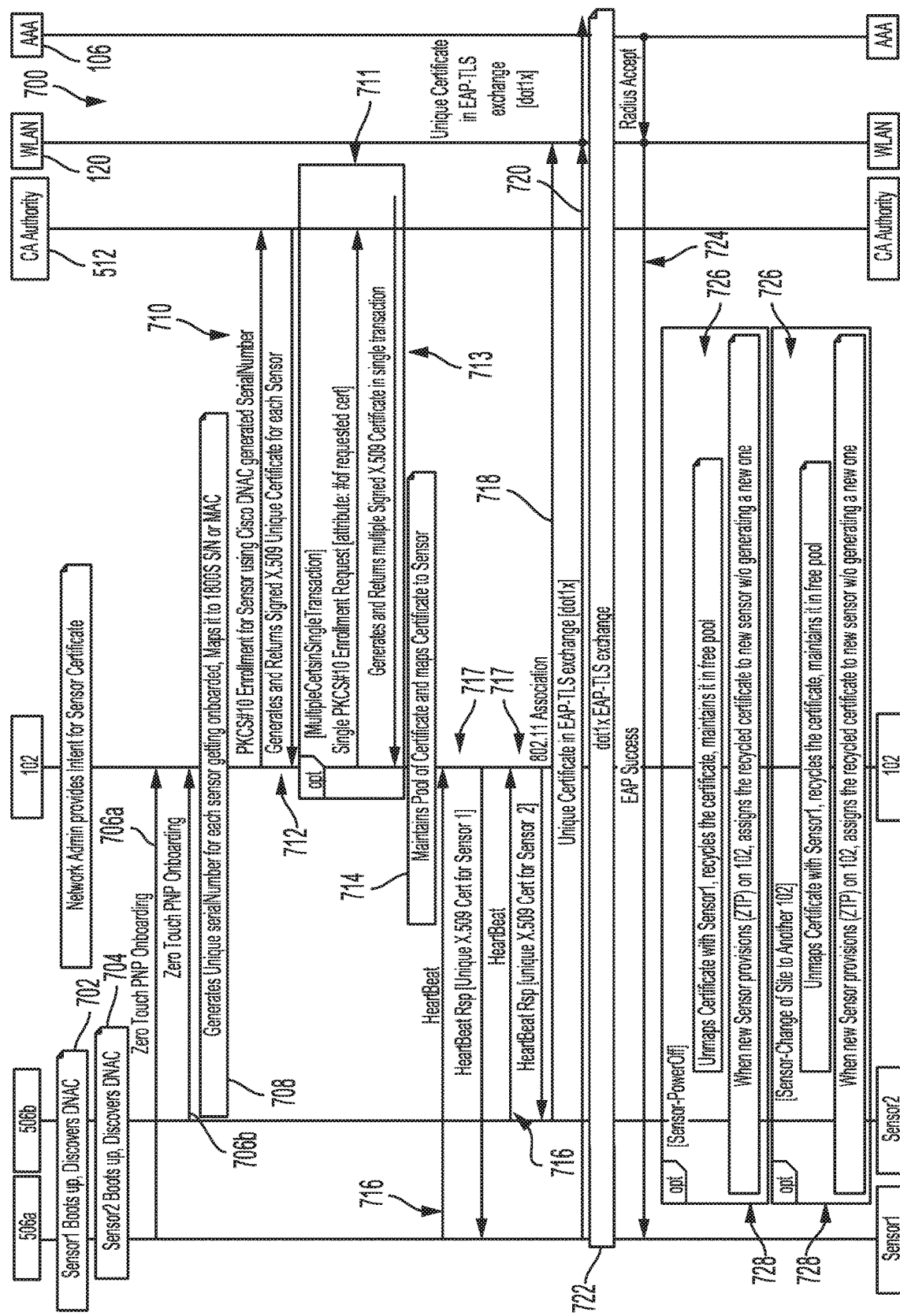
FIG. 7 illustrates a call flow diagram for management of certificates by the sensor certificate lifecycle manager.

FIG. 7 illustrates a call flow diagram 700 for managing the sensor 506 with respect to the network management system 102. In step 702, a user such as a network administrator can provide an intent for the certificate 510 for the sensor 506. In step 704, a first sensor 506a can boot up and discover the network management system 102 wherein the sensor 506a is onboarded onto the network management system 102 via zero touch PnP (ZTP) onboarding 706a, which allows the sensor to be provisioned onto the network automatically with minimal manual intervention. A second sensor 506b can also boot up and discover the network management system 102 wherein the sensor 506b is onboarded onto the network management system 102 via ZTP onboarding 706b. In step 708, the network management system 102 can generate a unique serialNumber for each sensor 506a, 506b getting onboarded and map the generated unique serialNumber to the S/N or MAC of each sensor 506a, 506b. In step 710, the network management system 102 can send a PKCS #10 enrollment for the sensors 506a, 506b using the generated unique serialNumber to the certificate authority 512. In step 712, the certificate authority 512 can generate and return the signed unique certificate 510, such as a X.509 unique certificate, for the first sensor 506a. Alternatively, in step 713, the network management system 102 could send a single PKCS #10 enrollment including an attribute for a number of requested certificates 510 for the sensors 506a, 506b whereby, in step 713, the certificate authority 512 can generate multiple signed unique certificates 510a, 510b in a single transaction. In step 714, the network management system 102 can then maintain a pool of signed unique certificates 510 (510a, 510b, etc.) and map certificates 510 to sensors 506.

In step 716, the first sensor 506a can send a first heartbeat message to the network management system 102, wherein in step 717, the network management system 102 can respond with a first heartbeat message response and append the signed unique certificate 510a to the first heartbeat message response for the first sensor 506a Similarly, the second sensor 506b can send a second heartbeat message to the network management system 102, wherein the network management system 102 can respond with a second heartbeat message response and append the signed unique certificate 510b to the second heartbeat message response for the second sensor 506b. In step 718, an association, such as an 802.11 association, can be established between the network fabric 120, such as WLAN, and the sensors 506a, 506b. The 802.11 association can involve 802.11 message exchanges from the sensors 506 to the network fabric 120 wherein the message exchanged are 902.11 Authentication Request and Response and 802.11 Association Request and Response. After the association, the sensors 506 can perform dot1x authentication to prove their identities, such as in step 720, the signed unique certificates 510 can be exchanged, such as through a dot1x EAP-TLS exchange 722 via IEEE 802.1X (dot1x) Port Based Authentication, and further passed onto the AAA appliance(s) 106. Furthermore, the dot1x EAP-TLS exchange 722 can occur between the sensors 506, the network management system 102, the certificate authority 512, the network fabric 120, and the AAA appliance(s) 106. In step 724, once successfully verified, the AAA appliance(s) 106 can utilize RADIUS to send an accept message to the network fabric 120, which then sends an EAP Success message back to the sensor 506.

Optionally, in step 726, when the sensor 506b is powered off or is changed to another site or another network management system, such that the heartbeat responses are not received at the expected intervals, the network management system 102 can unmap the signed unique certificate 510b associated with the sensor 506b, recycle the certificate 510b, and add the certificate 510b back into the certificate pool. In step 728, when a new sensor 506c provisions onto the network management system 102 via ZTP, it can be assigned the recycled certificate 510b without the need to generate a new certificate.

Figure 8A:
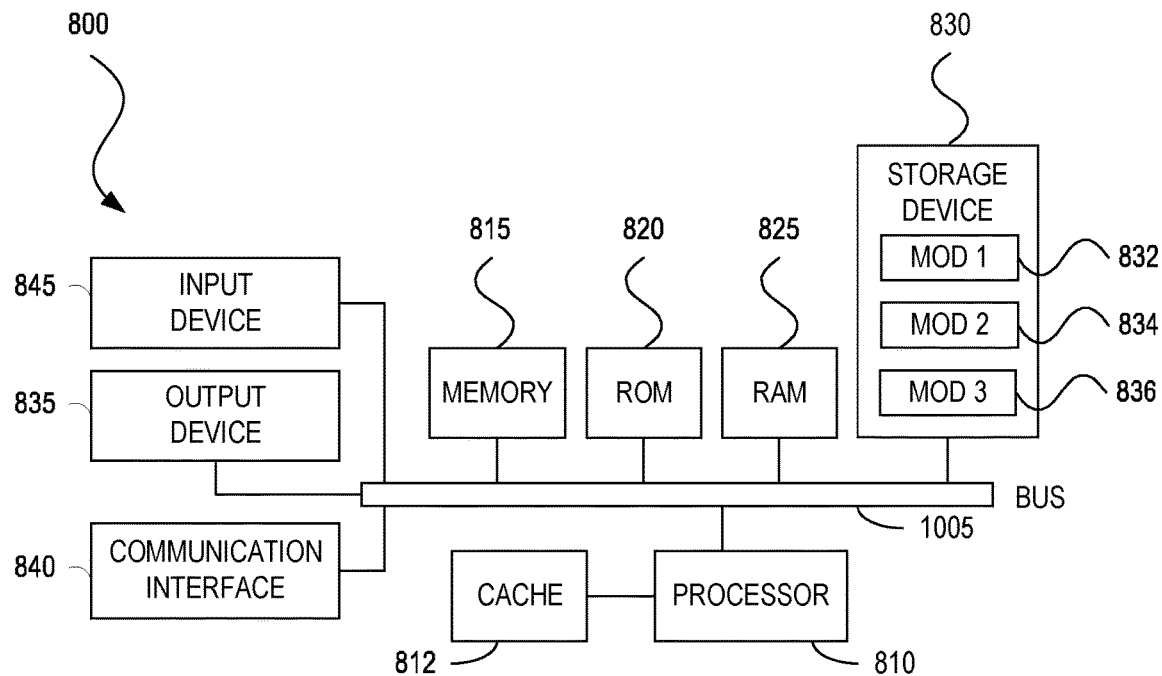
FIGS. 8A and 8B illustrate examples of systems in accordance with various embodiments.
Figure 8B:
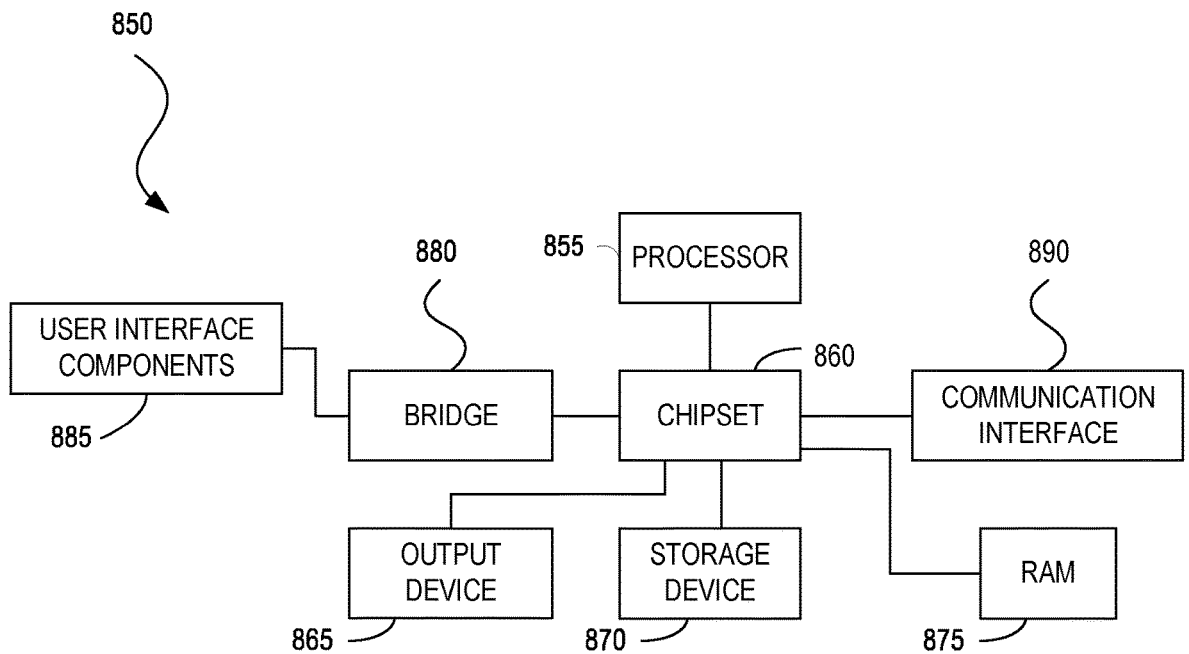

FIG. 8A and FIG. 8B illustrate systems in accordance with various embodiments. The more appropriate system will be apparent to those of ordinary skill in the art when practicing the various embodiments. Persons of ordinary skill in the art will also readily appreciate that other systems are possible.

FIG. 8A illustrates an example architecture for a conventional bus computing system 800 wherein the components of the system are in electrical communication with each other using a system bus 805. The computing system 800 can include a processing unit (CPU or processor) 810 and the system bus 805 that may couple various system components including the system memory 815, such as read only memory (ROM) in a storage device 870 and random access memory (RAM) 875, to the processor 810. The computing system 800 can include a cache 812 of high-speed memory connected directly with, in close proximity to, or integrated as part of the processor 810. The computing system 800 can copy data from the system memory 815 and/or the storage device 830 to the cache 812 for quick access by the processor 810. In this way, the cache 812 can provide a performance boost that avoids processor delays while waiting for data. These and other modules can control or be configured to control the processor 810 to perform various actions. Other system memory 815 may be available for use as well. The system memory 815 can include multiple different types of memory with different performance characteristics. The processor 810 can include any general purpose processor and a hardware module or software module, such as module 1 832, module 2 834, and module 3 838 stored in storage device 830, configured to control the processor 810 as well as a special-purpose processor where software instructions are incorporated into the actual processor design. The processor 810 may essentially be a completely self-contained computing system, containing multiple cores or processors, a bus, memory controller, cache, etc. A multi-core processor may be symmetric or asymmetric.

To enable user interaction with the computing system 800, an input device 845 can represent any number of input mechanisms, such as a microphone for speech, a touch-protected screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with the computing system 800. The communications interface 840 can govern and manage the user input and system output. There may be no restriction on operating on any particular hardware arrangement and therefore the basic features here may easily be substituted for improved hardware or firmware arrangements as they are developed.

Storage device 830 can be a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof.

The storage device 830 can include software modules 832, 834, 836 for controlling the processor 810. Other hardware or software modules are contemplated. The storage device 830 can be connected to the system bus 805. In one aspect, a hardware module that performs a particular function can include the software component stored in a computer-readable medium in connection with the necessary hardware components, such as the processor 810, the system bus 805, output device 835, and so forth, to carry out the function.

FIG. 8B illustrates an example architecture for a conventional chipset computing system 850 that can be used in accordance with an embodiment. The conventional chipset computing system 850 can include a processor 855, representative of any number of physically and/or logically distinct resources capable of executing software, firmware, and hardware configured to perform identified computations. The processor 855 can communicate with a chipset 860 that can control input to and output from the processor 855. In this example, the chipset 860 can output information to an output device 865, such as a display, and can read and write information to storage device 870, which can include magnetic media, and solid state media, for example. The chipset 860 can also read data from and write data to RAM 875. A bridge 880 for interfacing with a variety of user interface components 885 can be provided for interfacing with the chipset 860. The user interface components 885 can include a keyboard, a microphone, touch detection and processing circuitry, a pointing device, such as a mouse, and so on. Inputs to the conventional chipset computing system 850 can come from any of a variety of sources, machine generated and/or human generated.

The chipset 860 can also interface with one or more communication interfaces 890 that can have different physical interfaces. The communication interfaces 890 can include interfaces for wired and wireless LANs, for broadband wireless networks, as well as personal area networks.

Some applications of the methods for generating, displaying, and using the GUI disclosed herein can include receiving ordered datasets over the physical interface or be generated by the machine itself by processor 855 analyzing data stored in the storage device 870 or the RAM 875. Further, the computing system 800 can receive inputs from a user via the user interface components 885 and execute appropriate functions, such as browsing functions by interpreting these inputs using the processor 855.

It will be appreciated that computing systems 800 and the conventional chipset computing system 850 can have more than one processor 810 and 855, respectively, or be part of a group or cluster of computing devices networked together to provide greater processing capability.

An example embodiment can be a computer-implemented method comprising: onboarding a sensor 506 onto a network 100 managed by a network management system 102; generating a unique serial number for the sensor 506; sending a certificate signing request to a certificate authority 512; receiving a signed unique certificate 510 from the certificate authority 512; mapping the signed unique certificate 510 to the unique serial number for the sensor 506; and transmitting the signed unique certificate 510 to the sensor 506. The sensor 506 can be a troubleshooting sensor for the network management system 102. The computer-implemented method can further comprise: exchanging the signed unique certificate 510 in an EAP-TLS exchange between the sensor 506, the certificate authority 512, the network 100, and authentication, authorization, and accounting (AAA) appliances 106 of the network management system 102; and establishing a dot1x EAP-TLS exchange 722 between the sensor 506, the certificate authority 512, the AAA appliances 106 of the network management system 102. The certificate signing request can further include a requesting multiple certificates attribute and wherein the network management system 102 receives multiple signed unique certificates 510 for respective sensors 506 from the certificate authority 512. The network management system 102 can maintain a pool of signed unique certificates 510 of which the signed unique certificates 510 can be used to map onto incoming sensors 506.

The computer-implemented method can further comprise: unmapping the signed unique certificate 510a from its associated sensor 506a; maintaining the signed unique certificate 510a in the pool of signed unique certificates 510; and reassigning the signed unique certificate 510a to a new sensor 506b provisioned onto the network without generating a new certificate from the certificate authority 512. The signed unique certificate 510 can be a X.509 certificate and wherein # of certs requested can be an attribute in the certificate signing request to the certificate authority using a PKCSReg or a GetCert request. The certificate signing request can be a CertRequest.

An example embodiment can be non-transitory computer-readable medium comprising instructions stored thereon that when executed are effective to cause one or more processors of the network management system 102 to: receive, at the network management system 102 for the network 100, a request for a sensor certificate 510; onboard, via the network management system 102, the sensor 506 onto the network 100 managed by the network management system 102; generate, via a sensor certificate lifecycle manager 504 associated with the network management system 102, a unique serial number for the sensor 506 and mapping the unique serial number to the sensor's associated serial number or MAC address; send, via the sensor certificate lifecycle manager 504, a certificate signing request for the sensor 506 using the unique serial number to a certificate authority 512; receive, via the sensor certificate lifecycle manager 504, a signed unique certificate 510 for the sensor 506 from the certificate authority 512; map, via the network management system 102, the signed unique certificate 510 to the sensor 506; and maintain, via the network management system 102, an association between the sensor 506, certificate authority 512, and the network 100. The sensor 506 can be a troubleshooting sensor for the network management system 102.

An example embodiment can be a system 500 comprising: network management system 102 that controls and manages onboarding of troubleshooting sensors 506 onto a network 100 and maps signed unique certificates 510 to the troubleshooting sensors 506 without manual uploading of certificates 510 by a user; and a sensor certificate lifecycle manager 504, which interfaces with the network management system 102 and a certificate authority 512, wherein the sensor certificate lifecycle manager 504 can manage a pool of signed unique certificates 510 and revoke or reassign any signed unique certificates 510 that need to be revoked or reassigned. The sensor certificate lifecycle manager 504 can interface with the certificate authority 512 via an SCEP interface 514. The signed unique certificate 510 can be an EAP-TLS certificate. The system 500 can further comprise a zero-touch plug and play interface 508 for the sensors 506 to be onboarded through.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method comprising:
   onboarding a sensor onto a network managed by a network management system;
   generating a unique identifier for the sensor;
   mapping the unique identifier to a serial number of the sensor to distinctively associate the unique identifier with the serial number, wherein the unique identifier is reassignable to different sensors within the network;
   sending a certificate signing request to a certificate authority;
   receiving a signed unique certificate from the certificate authority, wherein the signed unique certificate includes the unique identifier;
   mapping the signed unique certificate to the unique identifier for the sensor and the signed unique certificate is recyclable to the different sensors within the network;
   assigning the signed unique certificate to the sensor;
   unmapping the signed unique certificate from the sensor; and
   reassigning the signed unique certificate to a new sensor provisioned onto the network without generating a new certificate from the certificate authority;
   wherein the unique identifier allows reuse and recycling of certificates for another sensor.

2. The computer-implemented method of claim 1, wherein the sensor is a troubleshooting sensor for the network management system.

3. The computer-implemented method of claim 1, further comprising:
   exchanging the signed unique certificate in an EAP-TLS exchange between the sensor, the certificate authority, the network, and authentication, authorization, and accounting (AAA) appliances of the network management system; and
   establishing a dot1x EAP-TLS exchange between the sensor, the certificate authority, and the AAA appliances of the network management system.

4. The computer-implemented method of claim 1, wherein the certificate signing request further includes a requesting multiple certificates attribute and wherein the network management system receives multiple signed unique certificates for respective sensors from the certificate authority.

5. The computer-implemented method of claim 4, wherein the network management system maintains a pool of signed unique certificates of which the signed unique certificates can be used to map onto incoming sensors.

6. The computer-implemented method of claim 4, wherein the signed unique certificate is a X.509 certificate and wherein # of cents requested for is an attribute in the certificate signing request to the certificate authority using a PKCSReg or a GetCert request.

7. The computer-implemented method of claim 6, wherein the certificate signing request is a CertRequest.

8. A non-transitory computer-readable medium comprising instructions stored thereon that when executed are effective to cause one or more processors of a network management system to:
   receive, at a network management system for a network, a request for a sensor certificate;
   onboard, via the network management system, a sensor onto the network managed by the network management system;
   generate, via a sensor certificate lifecycle manager associated with the network management system, a unique identifier for the sensor;
   map the unique identifier to a serial number of the sensor to distinctively associate the unique identifier with the serial number, wherein the unique identifier is reassignable to different sensors within the network;
   send, via the sensor certificate lifecycle manager, a certificate signing request for the sensor using the unique serial number to a certificate authority;
   receive, via the sensor certificate lifecycle manager, a signed unique certificate for the sensor from the certificate authority, wherein the signed unique certificate includes the unique identifier;
   map, via the network management system, the signed unique certificate to the sensor and the signed unique certificate is recyclable to the different sensors within the network based on the unique identifier being reassignable;
   assign the signed unique certificate to the sensor;
   unmap the signed unique certificate from the sensor; and
   reassign the signed unique certificate to a new sensor provisioned onto the network without generating a new certificate from the certificate authority;
   wherein the unique identifier allows reuse and recycling of certificates for another sensor.

9. The non-transitory computer-readable medium of claim 8, wherein mapping the unique serial number to the sensor comprises mapping the unique serial number to a MAC address of the sensor.

10. The non-transitory computer-readable medium of claim 8, wherein mapping the unique serial number to the sensor comprises mapping the unique serial number to a factory assigned serial number of the sensor.

11. The non-transitory computer-readable medium of claim 8, wherein the sensor is a troubleshooting sensor for the network management system.

12. The non-transitory computer-readable medium of claim 8, further comprising instructions to:
   exchange the signed unique certificate in an EAP-TLS exchange between the sensor, the certificate authority, the network, and authentication, authorization, and accounting (AAA) appliances of the network management system; and establishing a dot1x EAP-TLS exchange between the sensor, the certificate authority, the network, and the AAA appliances of the network management system.

13. The non-transitory computer-readable medium of claim 8, wherein the certificate signing request further includes a multiple certificates requesting attribute and wherein the network management system receives multiple signed unique certificates for respective sensors from the certificate authority.

14. The non-transitory computer-readable medium of claim 8, wherein the network management system maintains a pool of signed unique certificates of which the signed unique certificates can be used to map onto incoming sensors.

15. The non-transitory computer-readable medium of claim 10, wherein the signed unique certificate is a X.509 certificate and wherein # of cents requested for is an attribute in the certificate signing request to the certificate authority using a PKCSReg or a GetCert request.

16. The non-transitory computer-readable medium of claim 15, wherein the certificate signing request is a CertRequest.

17. A system comprising:
a network management system that controls and manages onboarding of troubleshooting sensors onto a network and maps signed unique certificates to the troubleshooting sensors without manual uploading of certificates by a user by:
onboarding a sensor onto the network;
generating a unique identifier for the sensor;
mapping the unique identifier to a serial number of the sensor to distinctively associate the unique identifier with the serial number, wherein the unique identifier is reassignable to different sensors within the network;
sending a certificate signing request to a certificate authority;
receiving a signed unique certificate from the certificate authority, wherein the signed unique certificate includes the unique identifier;
mapping the signed unique certificate to the unique identifier for the sensor and the signed unique certificate is recyclable to the different sensors within the network;
assigning the signed unique certificate to the sensor;
unmapping the signed unique certificate from the sensor;
reassigning the signed unique certificate to a new sensor provisioned onto the network without generating a new certificate from the certificate authority; and
a sensor certificate lifecycle manager, which interfaces with the network management system and a certificate authority, that manages a pool of signed unique certificates and revokes or reassigns any signed unique certificates that need to be revoked or reassigned;
wherein the unique identifier allows reuse and recycling of certificates for another sensor.

18. The system of claim 17 wherein the sensor certificate lifecycle manager interfaces with the certificate authority via a Simple Certificate Enrollment Protocol interface.

19. The system of claim 17 wherein the signed unique certificate is an EAP-TLS certificate.

20. The system of claim 17 wherein the system further comprises a zero-touch plug and play interface for the sensors to be onboarded through.

* * * * *